United States Patent [19]

Burcher et al.

[11] 4,088,408
[45] May 9, 1978

[54] DEVICE FOR MEASURING THE CONTOUR OF A SURFACE

[75] Inventors: Ernest E. Burcher, Newport News; Stephen J. Katzberg, Yorktown; William L. Kelly, IV, Hampton, all of Va.

[73] Assignee: The United States of America as represented by the Administrator of the National Aeronautics and Space Administration, Washington, D.C.

[21] Appl. No.: 740,155

[22] Filed: Nov. 8, 1976

[51] Int. Cl.² ............................................. G01B 11/30
[52] U.S. Cl. ..................................... 356/120; 356/167
[58] Field of Search ................... 356/167, 120, 2, 4–5, 356/209, 212; 250/201, 234

[56] References Cited

U.S. PATENT DOCUMENTS

| 3,719,421 | 3/1973 | Poilleux et al. ...................... 356/120 |
| 4,017,188 | 4/1977 | Sawatari ............................... 356/120 |

Primary Examiner—John K. Corbin
Assistant Examiner—Wm. H. Punter
Attorney, Agent, or Firm—William H. King; Howard J. Osborn; John R. Manning

[57] ABSTRACT

The invention is a device for measuring the contour of a surface. Light from a source is imaged by a lens onto the surface which concentrates the energy from the source into a spot. A scanning means is used to scan the spot across the surface. As the surface is being scanned the surface moves relative to the point of perfect focus. When the surface moves away from perfect focus the spot increases in size, while the total energy in the spot remains virtually constant. The lens then reimages the light reflected by the surface onto two detectors through two different sized apertures. The light energy going to the two detectors is separated by a beam splitter. This second path of the light energy through the lens further defocuses the spot, but as a result of the different sizes of the apertures in each light detector path, the amount of defocus for each is different. The ratio of the outputs of the two detectors which is indicative of the contour of the surface is obtained by a divider.

8 Claims, 1 Drawing Figure

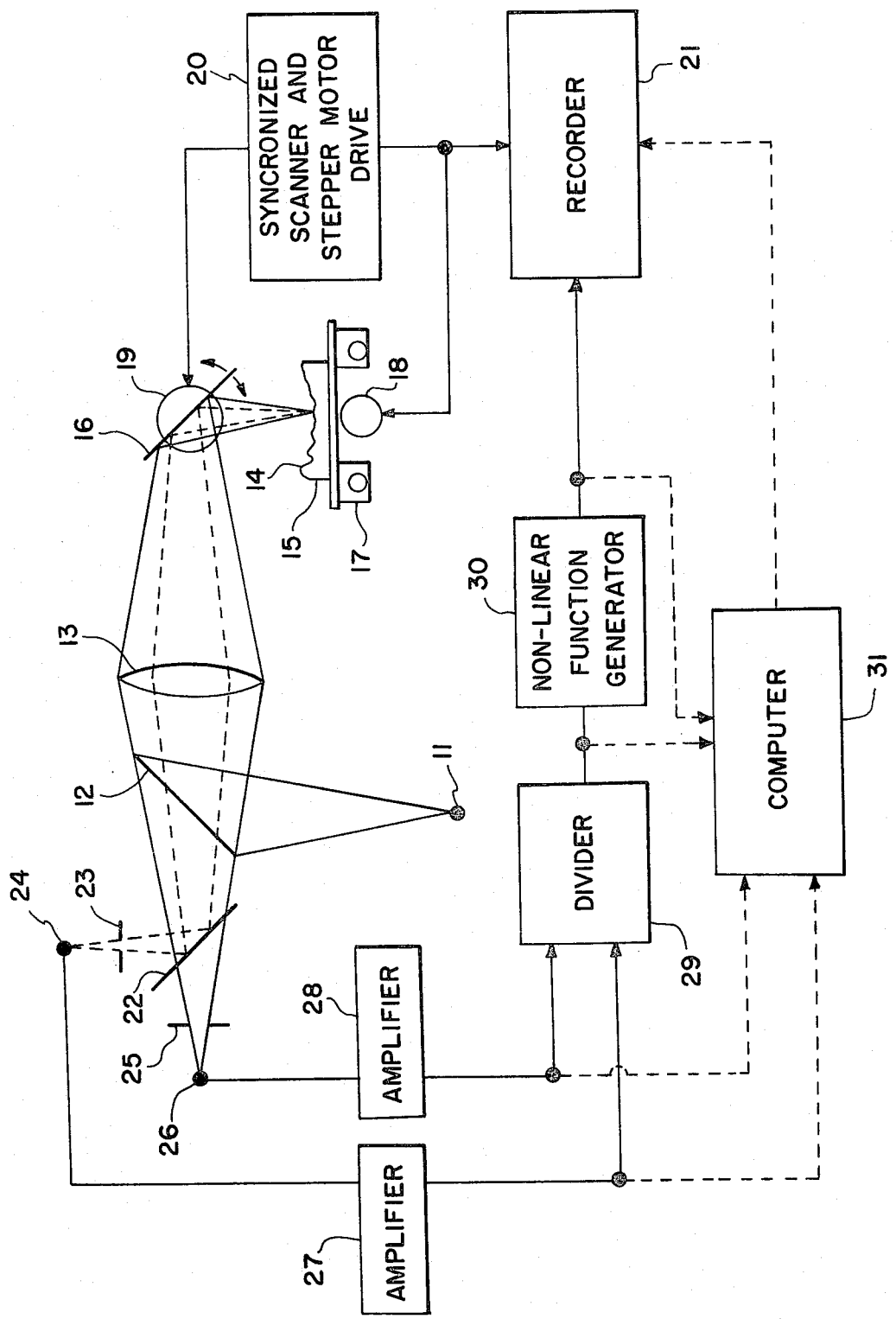

DEVICE FOR MEASURING THE CONTOUR OF A SURFACE

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates generally to an optical device for measuring the depth of a surface at a selected point and more specifically concerns an optical device for measuring the contour of a surface.

The prior art utilizes basically two types of devices for measuring the contour of a surface. They are mechanical depth gage devices and optical stereographic devices. The mechanical depth gage devices uses a probe which has graduated markings that are placed into contact with the surface, and the distance from some reference point is read. The probe is then moved about to take the number of measurements appropriate to the completeness of the data required. The optical stereographic devices use the principle of change of perspective with angle at a known distance to determine depth by geometry. Here again particular points are selected and geometry is employed until all necessary data is obtained.

The disadvantages of these prior art devices are the laborious point-to-point measurements necessary with the optical stereographic devices and the surface contacting that must be employed in the mechanical depth gage devices.

In another related type of device the principle of optical defocus is used to measure the roughness of a surface. An example of this type of device is disclosed in U.S. Pat. No. 3,734,626. This type of device could possibly be used to measure the contour of a surface; however, for such use it would be subjected to errors due to changes in reflectivity or slope of the surface.

It is therefore the primary purpose of this invention to provide a device for measuring the contour of a surface that is not subjected to errors due to the changes in reflectivity or slope of the surface.

It is another object of this invention to provide a device for measuring the depth of a surface without resorting to any motion of a depth determining senor.

A further object of this invention is to provide a device for measuring the depth of a surface without making actual contact with the surface.

Still another object of the invention is to provide a device for measuring the depth of a surface without having to make point-to-point measurements.

Other objects and advantages of this invention will become apparent in the following specification and drawing.

SUMMARY OF THE INVENTION

Light from a light source is focused by a lens onto the highest point of the surface whose contour is to be measured. This concentrates the energy from the light source into a spot. Scanning means are used to scan the spot over the surface. By the simple principles of geometric defocus, as the surface moves away from the perfect focus, the spot increases in size while the total energy in the spot remains virtually constant. Thus, the watts per centimeter squared decreases in the spot. The lens then reimages the light in the spot that is reflected by the surface in various degrees of defocus onto two detectors through two different sized apertures. This second pass of the energy through the lens further defocuses the spot, but as a result of the different sizes of the apertures in the each light detector path, the amount of defocus for each is different. Since the light detectors have a certain fixed size, then the total energy they receive decreases as the spot increases in size due to defocus. The outputs of the two detectors are fed to a divider which produces a ratio of the outputs for the detectors. This ratio is indicative of the contour of the surface. The output of the divider can be recorded on a recorder or it can be applied to a nonlinear function generator which produces a linear function of the contour before it is recorded. In either case, the recording is indicative of the contour of the surface scanned by the scanning means.

BRIEF DESCRIPTION OF THE DRAWINGS

The sole FIGURE in this application is a schematic drawing of a preferred embodiment of the invention.

DETAILED DESCRIPTION OF THE INVENTION

Turning now to the embodiment of the invention selected for illustration in the drawing, the number 11 designates a light source that is directed into a beam splitter 12. The light reflected by beam splitter 12 is focused by means of lens 13 onto the surface 14 of a sample 15 via a scanning mirror 16. Sample 15 is supported on a table 17 that is moved in discrete steps in a direction perpendicular to the line of scan of mirror 16 by means of a stepper motor 18. Scanner mirror 16 is controlled by a scanner 19 drive which scans the sample 15 each time the stepper motor 18 moves table 17 to one of its discrete locations. Stepper motor 18 and scanner drive 19 are controlled by a synchronized scanner and stepper motor drive 20 which also controls a recorder 21.

The light from source 11 is focused at a point preferably having a height equal to the height of the highest point of surface 14. However, the light can be focused at any point not lower than the highest point of surface 14. Consequently, as the light is scanned across the surface 14 and the elevation of the surface changes the surface moves away from the focus of the light thereby increasing the size of the spot of light on the surface. Thus, the watts per centimeter squared decreases in the spot. The light reflected by surface 14 passes back through lens 13 and beams splitter 12. Part of the light passed through beam splitter 12, is relfected by a beam splitter 22 and passes through a reference aperture 23 onto a reference detector 24, and another part of the light passed through beam splitter 12, passes through beam splitter 22 and a sample aperture 25 onto a sample detector 26. Lens 13 focuses the reflected light from surface 14 onto both the detector 24 and the detector 26. The size of reference aperture 23 is smaller than the size of sample aperture 25. Consequently, the ratio of the outputs of detector 24 and 26 is indicative of the depth of the surface 14 from which the light is reflected. In the embodiment of the invention shown the size of the reference aperture is 10 mils and the size of the sample aperture is 20 mils. However, it is apparent that many different sizes could be used.

The outputs of detectors 24 and 26 are amplified by amplifiers 27 and 28, respectively, and then applied to a divider 29. The output of amplifier 27 is applied to the denominator input of divider 29 and the output of amplifier 28 is applied to the numerator input of the divider. The output of divider 29 is indicative of the contour of surface 14 scanned by scanner 16. For the output of divider 29 to be meaningful, the device has to have been previously calibrated. The output of divider 29 can be recorded by recorder 21 or it can be linearized by means of a nonlinear function generator 23 before it is recorded. The function performed by generator 23 is determined by the calibration curves for the device. A computer 31 can be used to control the synchronized scanner and stepper motor drive 20. Computer 31 can be used in conjunction with divider 29 and nonlinear function generator 30 or it can be used to perform both of these functions in addition to controlling stepper motor drive 20.

The instrument shown in the drawing can be calibrated by focusing the light on a $MgCO_3$ surface as a reference. Then a lookup table is prepared by defocusing the light on the $MgCO_3$ surface in incremental steps and recording signals from the output of divider 29 for each step at zero deflection angle. The $MgCO_3$ surface is then replaced with the sample surface to be measured and the sample surface is positioned until the highest point of the sample is at the best focus position. The scanning mirror is then started on the edge of the sample. As the scanning mirror scans the image of the light source across the sample, the ratios of the signals from the reference an sample detectors are matched to the lookup table to determine the depth of the sample surface.

The embodiment of the invention shown in the drawing generates an error due to the type of scanning used. That is, when scanner 16 focus the light on the reference surface at an angle other than perpendicular to the reference surface an error is generated. This error can be corrected with the computer. However, a better solution to this problem is to let scanner 16 remain fixed in the position shown and move table 17 in two directions under the beam of light. This can easily be done with an X-Y recorder type of device.

Instead of mechanical apertures placed in the sample and reference channels, detectors with different filters or wavelength response can be used in conjunction with separation of the lens area into various wavelength transmission bands. That is, the lens may be coated to transmit all wavelengths at a center area and only a band of wavelengths over the rest of its surface. The light detectors may then have filters over them to select the wavelength bands from a full aperture and all wavelengths from only the center aperture of the lens. A laser could be used as the light source to modify the sensitivity to depth of the system as well as allow the use of higher "*f* number" optics.

The advantages of this invention are that it avoids laborious point-to-point measurements necessary with other optical methods; it does not require contacting the surface as employed in mechanical systems; and it eliminates errors that occur in previous defocusing systems due to changes of reflectivity or slope of the surface.

What is claimed is:

1. Apparatus for measuring the contour of a surface comprising:
   a source of light;
   means for directing light from said light source onto said surface;
   means for focusing the light directed onto said surface at a point not below the highest point on said surface;
   means for scanning said surface with said focused light;
   a first aperture;
   a second aperture larger than said first aperture;
   means for focusing and directing part of the light reflected by said surface through said first aperture and for focusing and directing another part of the light reflected by said surface through said second aperture;
   first detector means located at the focus of the light passed through said first aperture for producing a first signal proportional to light passed through said first aperture;
   second detector means located at the focus of the light passed through said second aperture for producing a second signal proportional to light passed through said second aperture; and
   means for obtaining the ratio of said first and second signals whereby said ratio is indicative of the contour of said surface.

2. Apparatus for measuring the contour of a surface according to claim 1 wherein said means for directing part of the reflected light through a first aperture and for directing another part of the reflected light through said second aperture is a beam splitter.

3. Apparatus for measuring the contour of a surface according to claim 1 wherein said means for obtaining the ratio of said first and second signals is a divider.

4. Apparatus for measuring the contour of a surface according to claim 1 including nonlinear function generator means for linearizing said ratio.

5. Apparatus for measuring the depth of a surface at a selected location comprising:
   a light source;
   means for directing light from said light source onto said surface at said selected location;
   means for focusing the light directed onto surface at a point not below the highest point on said surface;
   a first aperture;
   a second aperture larger than said first aperture;
   means for focusing and directing part of the light reflected by said surface through said first aperture and for focusing and directing another part of the light reflected by said surface through said second aperture;
   first detector means located at the focus of the light passed through said first aperture for producing a first signal proportional to the light passed through said first aperture; and
   second detector means located at the focus of the light passed through said second aperture for producing a second signal proportional to the light passed through said second aperture; and
   means for obtaining the ratio of said first and second signals whereby said ratio is indicative of the height of said point above said surface.

6. Method for measuring the depth of a surface at a selected location comprising the steps of:
   directing light from a light source onto said surface at said selected location;
   focusing the light directed onto said surface at a point not below the highest point on said surface;

focusing part of the light reflected by said surface through a first aperture onto a first detector located at the focus of the light passed through said first aperture;

focusing a different part of the light reflected by said surface through a second aperture larger than said second aperture onto a second detector located at the focus of the light passed through said second aperture; and producing the ratio of the resulting outputs of said first and second detectors.

7. Apparatus for measuring the depth of a surface at a selected location comprising:

a light source;

means for directing light from said light source onto said surface at said selected location;

means for focusing the light directed onto said surface at a point not below the highest point on said surface whereby the diameter of the resulting spot of light on said surface varies directly with the distance said point is from said surface;

means for producing a first signal proportional to the light reflected from a first area in the center of said spot of light and focused at a predetermined point;

means for producing a second signal proportional to the light reflected from a second area in the center of said spot of light and focused at a point the same distance from said surface as said predetermined point said second area being larger than and concentric with said first area; and means for obtaining the ratio of said first and second signals whereby said ratio is indicative of the distance between said point and said surface.

8. Method for measuring the depth of a surface at a selected location comprising the steps of:

directing the light from a light source onto said surface at said selection location;

focusing the light directed onto said surface at a point not below the highest point on said surface whereby the diameter of the resulting spot of light on said surface varies directly with the distance said point is from said surface;

focusing the light reflected from a first area in the center of said spot of light and producing a first signal proportional to this focused light;

focusing at the same distance from said surface as said first area focused light the light reflected from a second area in the center of said spot of light and producing a second signal proportional to this focused light said second area being larger than and concentric with said first area; and obtaining the ratio of said first and second signals whereby said ratio is indicative of the distance between said point and said surface.

* * * * *